(12) United States Patent
Van Hove et al.

(10) Patent No.: US 8,925,748 B2
(45) Date of Patent: Jan. 6, 2015

(54) INTEGRALLLY BLOW-MOULDED BAG-IN-CONTAINER HAVING A BAG ANCHORING POINT; PROCESS FOR THE PRODUCTION THEREOF; AND TOOL THEREOF

(75) Inventors: Sarah Van Hove, Korbeek-Dijle (BE); Daniel Peirsman, Bornem (BE); Rudi Verpoorten, Lommel (BE)

(73) Assignee: Anheuser-Busch InBev S.A., Brussels (BE)

(*) Notice: Subject to any disclaimer, the term of this patent is extended or adjusted under 35 U.S.C. 154(b) by 890 days.

(21) Appl. No.: 12/450,904

(22) PCT Filed: Apr. 18, 2008

(86) PCT No.: PCT/EP2008/054768
§ 371 (c)(1),
(2), (4) Date: May 24, 2010

(87) PCT Pub. No.: WO2008/129015
PCT Pub. Date: Oct. 30, 2008

(65) Prior Publication Data
US 2010/0243596 A1    Sep. 30, 2010

Related U.S. Application Data

(63) Continuation-in-part of application No. 11/785,748, filed on Apr. 19, 2007, now abandoned.

(51) Int. Cl.
| | | |
|---|---|---|
| B65D 23/02 | (2006.01) | |
| B29C 49/22 | (2006.01) | |
| B29C 49/06 | (2006.01) | |
| B65D 83/00 | (2006.01) | |
| B29B 11/08 | (2006.01) | |
| B29B 11/14 | (2006.01) | |
| B29C 45/16 | (2006.01) | |
| B29K 23/00 | (2006.01) | |
| B29K 67/00 | (2006.01) | |
| B29K 77/00 | (2006.01) | |

(52) U.S. Cl.
CPC ............... *B29C 49/221* (2013.01); *B29C 49/06* (2013.01); *B65D 23/02* (2013.01);
(Continued)

(58) Field of Classification Search
CPC .......................... B65D 23/02; B65D 83/0055
USPC .................... 215/12.1, 902; 220/626, 495.04
See application file for complete search history.

(56) References Cited

U.S. PATENT DOCUMENTS

| | | |
|---|---|---|
| 3,450,254 A | 6/1969 | Miles |
| 3,484,011 A | 12/1969 | Greenhalgh et al. |

(Continued)

FOREIGN PATENT DOCUMENTS

| | | |
|---|---|---|
| EP | 1 167 223 | 1/2002 |
| EP | 1 180 424 | 2/2002 |

(Continued)

*Primary Examiner* — Sue A Weaver
(74) *Attorney, Agent, or Firm* — Levy & Grandinetti

(57) ABSTRACT

The invention is an integrally blow-moulded bag-in-container (2) obtainable by blow-moulding an injection moulded multi-layer preform (1). The bag-in-container (2) includes an inner layer (21) forming the bag and an outer layer (22) forming the container, and a single opening (5), the mouth, fluidly connecting the volume defined by the bag (21) to the atmosphere. The container further includes at least one interface vent (3) fluidly connecting the interface between inner and outer layers to the atmosphere, wherein the bag (21) is anchored to the outer layer (22) at at least one point (7) remote from the single opening (5) and interface vent (3). The invention also relates to a process and a mould for the production of the blow-moulded bag-in-container (2).

9 Claims, 3 Drawing Sheets

(52) U.S. Cl.
CPC ............ B65D 83/0055 (2013.01); *B29B 11/08* (2013.01); *B29B 11/14* (2013.01); *B29B 2911/14053* (2013.01); *B29B 2911/14066* (2013.01); *B29B 2911/1408* (2013.01); *B29B 2911/14093* (2013.01); *B29B 2911/14113* (2013.01); *B29B 2911/1414* (2013.01); *B29B 2911/143* (2013.01); *B29B 2911/14313* (2013.01); *B29B 2911/14326* (2013.01); *B29B 2911/14333* (2013.01); *B29B 2911/1444* (2013.01); *B29C 45/1684* (2013.01); *B29K 2023/06* (2013.01); *B29K 2023/065* (2013.01); *B29K 2023/086* (2013.01); *B29K 2023/12* (2013.01); *B29K 2067/00* (2013.01); *B29K 2067/046* (2013.01); *B29K 2077/00* (2013.01); *Y10S 215/902* (2013.01)
USPC ................. 215/12.1; 215/902; 220/495.04; 220/626

(56) References Cited

U.S. PATENT DOCUMENTS

| | | | | |
|---|---|---|---|---|
| 3,491,918 | A * | 1/1970 | Lucas | 222/635 |
| 3,632,004 | A * | 1/1972 | Grimes et al. | 215/232 |
| 4,330,066 | A | 5/1982 | Berliner | |
| 4,892,230 | A | 1/1990 | Lynn, Jr. | |
| 5,301,838 | A | 4/1994 | Schmidt et al. | |
| 5,407,629 | A | 4/1995 | Schmidt et al. | |
| 5,508,076 | A * | 4/1996 | Bright | 428/36.6 |
| 5,921,438 | A * | 7/1999 | Kobayashi et al. | 222/95 |
| 6,205,847 | B1 * | 3/2001 | Nomoto | 73/49.2 |
| 6,238,201 | B1 | 5/2001 | Safian | |
| 6,649,121 | B1 * | 11/2003 | Hamamoto et al. | 264/513 |
| 8,118,183 | B2 * | 2/2012 | Iwahashi et al. | 215/12.2 |
| 2004/0112921 | A1 | 6/2004 | Nomoto et al. | 222/321.9 |
| 2004/0217128 | A1 * | 11/2004 | Nakamura et al. | 222/95 |
| 2006/0073294 | A1 * | 4/2006 | Hutchinson et al. | 428/35.7 |
| 2006/0141189 | A1 * | 6/2006 | Akiyama et al. | 428/35.7 |

FOREIGN PATENT DOCUMENTS

| | | | |
|---|---|---|---|
| EP | 1 356 915 A1 | | 10/2003 |
| EP | 1 593 605 | | 11/2005 |
| JP | 04-267727 | | 9/1992 |
| JP | 05-213373 | | 8/1993 |
| JP | 07-048519 | | 2/1995 |
| JP | 08-001761 | | 1/1996 |
| JP | 09150830 A | * | 6/1997 |
| JP | 09-208688 | | 8/1997 |
| JP | 10-128833 | | 5/1998 |
| JP | 10 180853 | | 7/1998 |
| JP | 10-180853 | | 7/1998 |
| JP | 11-010719 | | 1/1999 |
| JP | 2005-047172 | | 2/2005 |
| WO | WO 91/08099 | * | 6/1991 |
| WO | WO 01/85420 | * | 11/2001 |

* cited by examiner

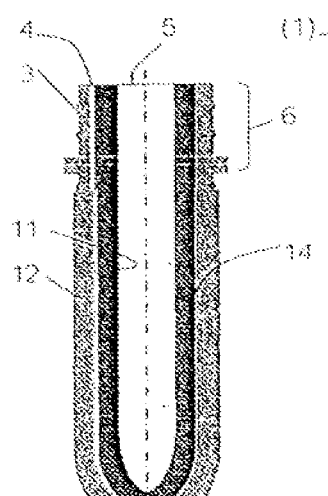
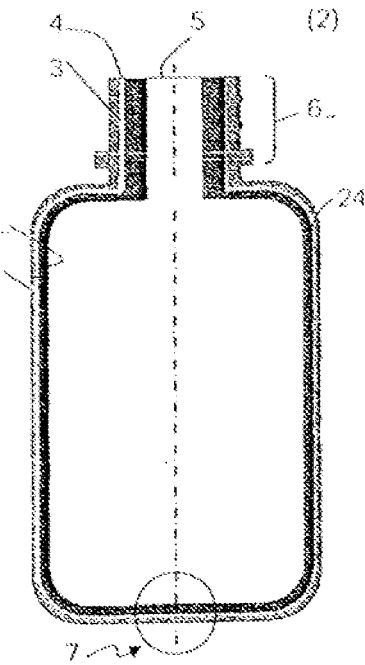
Figure 1A        Figure 1B
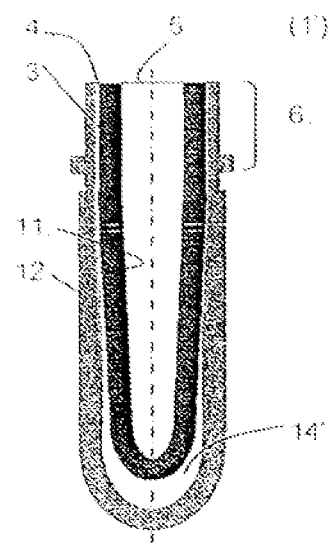
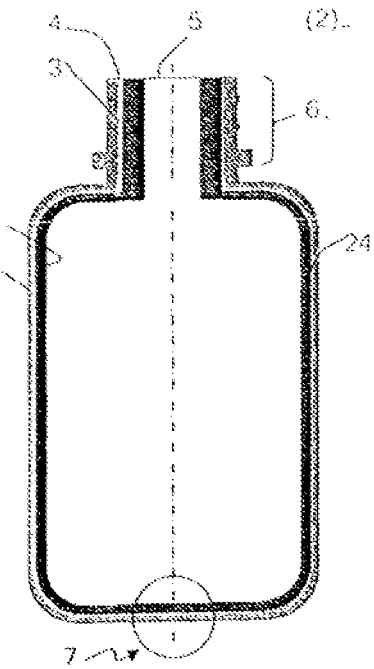
Figure 1C        Figure 1D

INTEGRALLLY BLOW-MOULDED BAG-IN-CONTAINER HAVING A BAG ANCHORING POINT; PROCESS FOR THE PRODUCTION THEREOF; AND TOOL THEREOF

This application is filed under 35 U.S.C. § 371 and is a continuation application of International Application Number PCT/EP2008/054768, filed on Apr. 18, 2008, which is a continuation-in-part of U.S. application Ser. No. 11/785,748, filed on Apr. 19, 2007.

FIELD OF THE INVENTION

The present invention relates in general to new developments in dispensing bag-in-containers and, in particular, to anchoring means for fixing the bag to the container at at least one point in order to stabilize it during collapse thereof upon use. It also relates to a method and tool for producing said bag-in-containers.

BACKGROUND OF THE INVENTION

Bag-in-containers, also referred to as bag-in-bottles or bag-in-boxes depending on the geometry of the outer vessel, all terms considered herein as being comprised within the meaning of the term bag-in-container, are a family of liquid dispensing packaging consisting of an outer container comprising an opening to the atmosphere—the mouth—and which contains a collapsible inner bag joined to said container and opening to the atmosphere at the region of said mouth. The system must comprise at least one vent fluidly connecting the atmosphere to the region between the inner bag and the outer container in order to control the pressure in said region to squeeze the inner bag and thus dispense the liquid contained therein.

Traditionally, bag-in-containers, were—and still are—produced by independently producing an inner bag provided with a specific neck closure assembly and a structural container (usually in the form of a bottle). The bag is inserted into the fully formed bottle opening and fixed thereto by means of the neck closure assembly, which comprises one opening to the interior of the bag and vents fluidly connecting the space between bag and bottle to the atmosphere; examples of such constructions can be found inter alia in U.S. Pat. No. 3,484,011, U.S. Pat. No. 3,450,254, U.S. Pat. No. 4,330,066, and U.S. Pat. No. 4,892,230. These types of bag-in-containers have the advantage of being reusable, but they are very expensive and labour-intensive to produce.

More recent developments focused on the production of "integrally blow-moulded bag-in-containers" thus avoiding the labour-intensive step of assembling the bag into the container, by blow-moulding a polymeric multilayer preform into a container comprising an inner layer and an outer layer, such that the adhesion between the inner and the outer layers of the thus produced container is sufficiently weak to readily delaminate upon introduction of a gas at the interface. The "inner layer" and "outer layer" may each consist of a single layer or a plurality of layers, but can in any case readily be identified, at least upon delamination. Said technology involves many challenges and many alternative solutions were proposed.

The multilayer preform may be extruded or injection moulded (cf. U.S. Pat. No. 6,238,201, JPA10128833, JPA11010719, JPA9208688, U.S. Pat. No. 6,649,121. When the former method is advantageous in terms of productivity, the latter is preferable when wall thickness accuracy is required, typically in containers for dispensing beverage.

Preforms for the production of integrally blow-moulded bag-in-containers clearly differ from preforms for the production of blow-moulded co-layered containers, wherein the various layers of the container are not meant to delaminate, in the thickness of the layers. A bag-in-container is comprised of an outer structural envelope containing a flexible, collapsible bag. It follows that the outer layer of the container is substantially thicker than the inner bag. This same relationship can of course be found in the preform as well, which are characterized by an inner layer being substantially thinner than the outer layer. Moreover, in some cases, the preform already comprised vents which are never present in preforms for the production of co-layered containers (cf. EPA1356915).

The formation of the vents fluidly connecting the space or interface between bag and bottle to the atmosphere remains a critical step in integrally blow-moulded bag-in-containers and several solutions were proposed in e.g., U.S. Pat. No. 5,301,838, U.S. Pat. No. 5,407,629, JPA5213373, JPA8001761, EPA1356915, U.S. Pat. No. 6,649,121, JPA10180853. One redundant problem with integrally blow-moulded bag-in-containers is the choice of materials for the inner and outer layers which must be selected according to strict criteria of compatibility in terms of processing on the one hand and, on the other hand, of incompatibility in terms of adhesion. These criteria are sometimes difficult to fulfil in combination as illustrated below. The thermal properties of the materials of the inner and outer layers should be as close as possible for the blow-moulding step, but should differ sufficiently for the injection moulding production of an integral multilayer preform.

Beside the thermal properties, it should be ensured that the inner and outer layers form a weak interface to ensure proper delamination of the inner layer from the outer layer upon use; JP2005047172 states that the inner and outer layers should be made of "mutually non-adhesive synthetic resins."

As an interface between inner and outer layer is inevitably formed upon blow-moulding, which strength may not always be as uniform as one could desire, due to various phenomena during the blow-moulding stage, such as local heat gradients, differential resin stretch and flow rates at different points of the vessel, etc., the delamination of the inner bag from the outer layer is not always perfectly controllable. It has been observed that the two layers may delaminate preferentially on one side of the bag-in-container due to a local weakness of the interface and, as the bag starts shrinking asymmetrically bending and folding with the risk of forming pockets full of liquid separated from the container's mouth. If this happens, the bag-in-container cannot be used anymore although it can still contain a considerable amount of liquid.

JP4267727 suggests to fix the inner and outer layers at their bottoms without disclosing how to achieve this. In Japanese Utility Model JP7048519, one end of a co-extruded multi-layer parison is pinched off such that mutually engaging corrugations are formed, and fixing the structure through an additional device prior to blow-moulding. U.S. Pat. No. 6,649,121 proposes to fix the inner bag to the outer layer by forming at the bottom of the inner layer of the preform to be blow-moulded into the bag-in-container, a protrusion which fits a through hole formed at the bottom of the outer layer and engages mechanically on the outer surface of the outer layer. This geometry appears to be maintained through the blow-moulding process by limiting the axial stretch of the bottom area of the container through the driving downwards of a stretching rod.

Co-extruded parisons as described in the foregoing Japanese Utility Model do not allow the same wall thickness control as when injection moulded preforms are used, which is required in applications in the field of pressurized beverage dispense bag-in-containers. The solution proposed in U.S. Pat. No. 6,649,121 applies to bag-in-containers wherein the liquid contained in the bag is dispensed by decreasing the pressure in the bag and does not allow to dispense liquid by injection of a pressurized gas at a point of the interface between the inner and outer layers because the inner layer's protrusion is not meant to engage hermetically on the outer surface of the outer layer. Indeed, the solution proposed in U.S. Pat. No. 6,649,121 includes that air must penetrate through the interstice between the protrusion and the through hole wall to compensate for the growing pressure drop as a gap is formed between the inner and outer layers upon extracting the liquid by vacuum and the resulting shrinking of the bag.

It follows from the foregoing that there remains a need in the art for an integrally blow-moulded bag-in-container that allows controlled delamination of the inner bag from the outer container upon injection of a pressurized gas at the interface thereof.

SUMMARY OF THE INVENTION

The present invention is defined in the appended independent claims. Preferred embodiments are defined in the dependent claims. In particular the present invention relates to an integrally blow-moulded bag-in-container obtainable by blow-moulding an injection moulded multi-layer preform. The bag-in-container includes an inner layer forming the bag and an outer layer forming the container, and a single opening, the mouth, fluidly connecting the volume defined by the bag to the atmosphere. The container further includes at least one interface vent fluidly connecting the interface between inner and outer layers to the atmosphere, wherein the bag is anchored to the outer layer at at least one point remote from the single opening.

It also concerns a process for producing a bag-in-container as described above comprising the following steps:
providing a polymer preform comprising two layers;
bringing the preform to blow-moulding temperature;
blow-moulding the thus heated preform to form a bag-in-container;
wherein during the process, the inner bag is anchored to the outer layer at at least one point remote from the bag-in-container's mouth.

The anchoring may be realized through locally enhanced mechanical, physical, or chemical adhesion between the inner and outer layers, or combinations thereof.

Locally enhanced mechanical adhesion may be provided with a blow-moulding tool comprising for example a sump or depression in which inner and outer layers engage during the blow-moulding process and thus become interlocked.

The sump or depression may be provided in the blow-moulding tool by inserting therein a chime defining said sump or depression. When effecting the blow-moulding operation with the chime incorporated in the blow-moulding tool the interlocking between the inner and outer layers is achieved and additionally the chime is readily fixed to the container.

BRIEF DESCRIPTION OF THE DRAWINGS

FIG. 1A is a schematic cross-sectional representation of a first embodiment of a preform according to the invention.

FIG. 1B is a schematic cross-sectional representation of a bag-in-container obtained after blow-moulding a first embodiment of a preform.

FIG. 1C is a schematic cross-sectional representation of a second embodiment of a preform according to the invention.

FIG. 1D is a schematic cross-sectional representation of a bag-in-container obtained a blow-moulding a second embodiment of a preform.

DETAILED DESCRIPTION OF THE INVENTION

Figure 2:
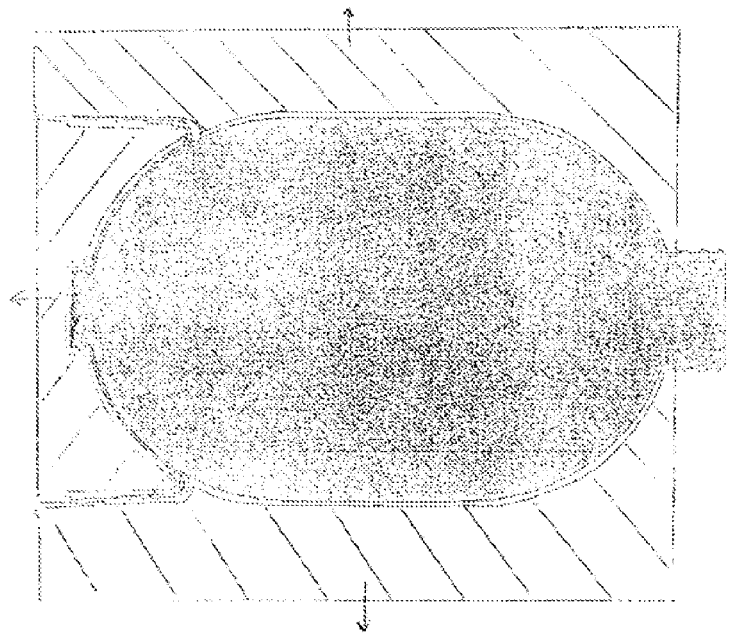
FIG. 2 is a schematic representation of a blow-moulding tool with a bag-in-container therein.

Referring now to appended FIGS. 1A to 1D, there is illustrated an integrally blow-moulded bag-in-container (2) (ef. FIGS. 1B and 1D) and a preform (1) & (1') for its manufacturing (ef. FIGS. 1A and 1C). The preform (1) comprises an inner layer (11) and an outer layer (12) joined at least at the level of the neck region (6) by an interface (shown on the right hand side), The region between inner and outer layers (11) and (12) may either consist of an interface (14) wherein the two layers are substantially contacting each other (ef. FIG. 1A). or comprise a gap (14') in fluid communication with at least one vent (3). Said vent (3) comprises an opening to the atmosphere in (4) (ef. FIG. 1C).

Figures 4, 5:
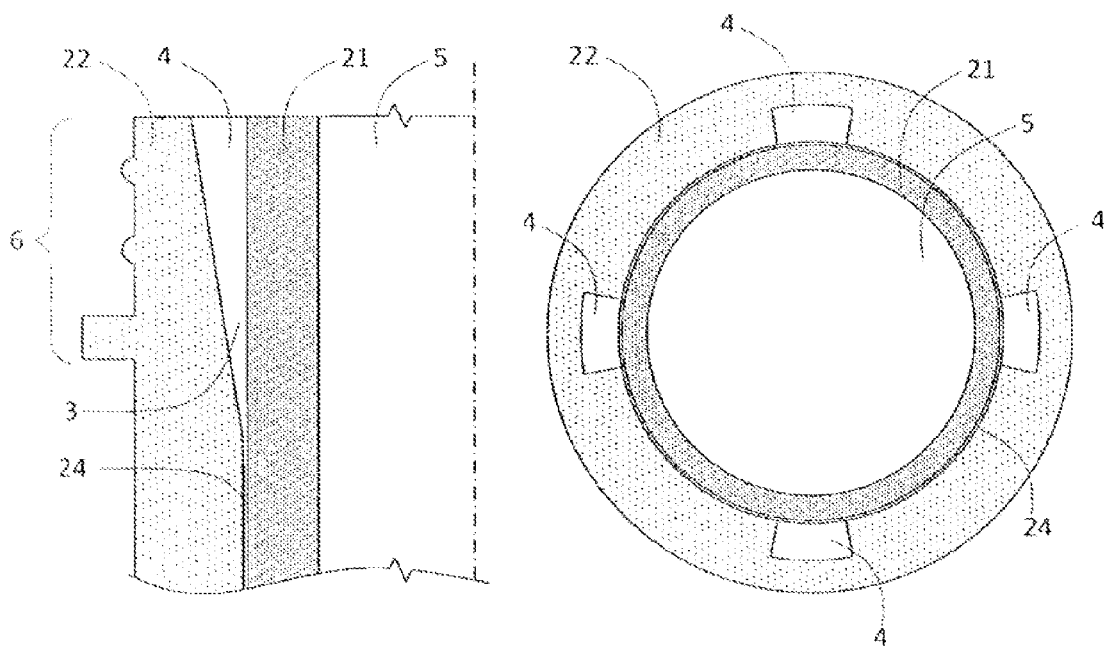
FIG. 4 illustrates a side view cut of a wedge shaped vent.
FIG. 5 illustrates a top view of the mouth region of a bag-in-container comprising several vents distributed around the lip of the mouth.

Many vent geometries have been disclosed and it is not critical which geometry is selected. It is preferred, however, that the vent be located adjacent to, and oriented coaxially with said preform's mouth (5) as illustrated in FIG. 1. As illustrated in FIG. 4, the vents more preferably have the shape of a wedge with the broad side at the level of the opening (4) thereof and getting thinner as it penetrates deeper into the vessel, until the two layers meet to form an interface (14) at least at the level of the neck region. This geometry allows for a more efficient and reproducible delamination of the inner bag upon use of the bag-in-container. As shown in FIG. 5, the container may comprise one or several vents evenly distributed around the lip of the bag-in-container's mouth. Several vents are advantageous as they permit the interface of the inner and outer layers (21) and (22) of the bag-in-container (2) to release more evenly upon blowing pressurized gas through said vents. Preferably, the preform comprises two vents opening at the vessel's mouth lip at diametrically opposed positions. More preferably, three, and most preferably, at least four vents open at regular intervals of the mouth lip.

The preform may consists of an assembly of two independent injection moulded preforms (11) and (12) produced independently from one another and thereafter assembled such that the inner preform (11) fits into the outer preform (12). This solution allows for greater freedom in the design of the neck and vents, as well as in the choice of materials constituting each preform component. Alternatively, it can be an integral preform obtained by injection moulding one layer on top of the other. The latter embodiment is advantageous over the assembled preform in that it comprises no assembly step and one production station only is required for the preform fabrication. On the other hand, the design of the vents in particular is restricted and the respective melting temperatures of the inner and outer layers must be carefully matched depending on which layer is injected first; the rule of thumb being that the layer being injected first generally requires a higher melting temperature.

The inner and outer layers of the preform (1) may consist of different materials or the same material. In case different materials are used, some requirements must be fulfilled depending on the process parameters in the injection moulding of the preform as well as in the blow-moulding of the bag-in-container. It is important of course that both materials may be processed in a rather similar process window and that they will not form too strong an interface which would not satisfactorily release upon injecting pressurized gas at the interface.

Alternatively and surprisingly, good results can be obtained also with preforms wherein both inner and outer layers consist of the same material. Particularly in case of integral, over-moulded preforms, it is generally believed that better results are obtained with semi-crystalline polymers.

The same polymer is considered in contact on either side of the interface between the inner and outer layers in the following cases:

inner and outer layers consist of the same material (e.g., $PET_{inner}PET_{outer}$, regardless of the specific grade of each PET); or
  the inner and outer layers consist of a blend or copolymer having at least one polymer in common, provided said polymer in common is at the interface, whilst the differing polymer is substantially absent of said interface (e.g., $(0.85\ PET+0.15\ PA6)_{inner}(0.8\ PET+0.2)_{outer}$.

The presence in a layer of low amounts of additives is not regarded as rendering the material different, so far as they do not alter the interface substantially.

Preferred materials for the preform and bag-in-container of the present invention are polyesters like PET, PEN, PTT, PTN; polyamides like PA6, PA66, PA11, PA12; polyolefins like PE, PP; EVOH; biodegradable polymers like polyglycol acetate (PGAc), Polylactic acid (PLA); and copolymers and blends thereof. In case different materials are used for the inner and outer layers, their optimal blow-moulding temperature should not differ from one another by more than 70° C., preferably 40° C., most preferably 10° C., and ideally should have the same blow-moulding temperature.

The two layers (11) and (12) of the preform may be connected by an interface (14) throughout substantially the whole inner surface of the outer layer. Inversely, they may be separated over a substantial area of the preform's body by a gap (14) containing air and which is in fluid communication with at least one interface vent (3). The latter embodiment is easier to realize when using a preform assembly designed such that the inner preform is firmly fixed to the outer preform at the neck region (6) and a substantial gap (14) may thus be formed between inner and outer layers (11) and (12).

The bag-in-container (2) of the present invention is obtained by providing a preform as described above; bringing the inner and outer layers of said preform to blow-moulding temperature; fixing the thus heated preform at the level of the neck region with fixing means in the blow-moulding tool; and blow-moulding the thus heated preform to form a bag-in-container, such that the inner layer is locally anchored to the outer layer at a location (7) remote from the bag-in-container's neck region.

The inner and outer layers (21) and (22) of the thus obtained bag-in-container are connected to one another by an interface (24) over substantially the whole of the inner surface of the outer layer. Said interface (24) is in fluid communication with the atmosphere through the vents (3), which maintained their original geometry through the blow-moulding process since the neck region of the preform where the vents are located is held firm by the fixing means and is not stretched during blowing.

It is essential that the interface (24) between inner and outer layers (21) and (22) releases upon blowing pressurized gas through the vents in a consistent and reproducible manner. The success of said operation depends on a number of parameters, in particular, on the interfacial adhesive strength, the number, geometry, and distribution of the vents, the pressure of the gas injected, and the inner bag stability. The latter can be substantially improved by fixing the inner layer to the outer layer at a location remote from the neck region and mouth of the bag-in-container, such that the interface between inner and outer layers will not release at said anchoring point upon injecting pressurized gas at a point of the interface. The bag is thus fixed at two points remote from one another: the neck region and the anchoring point. This allows to better control the collapse of the bag, which is essential for a reliable and reproducible operation of the bag-in-container.

The anchoring of the inner to the outer layers may be provided by a locally enhanced mechanical, physical, or physical adhesion. Mechanical adhesion includes any interaction between inner and outer layers at all scales spanning from macroscopic mechanical interlocking to cross-crystallinity as well as molecular inter-diffusion across the interface, all phenomena well known to the person skilled in the art. Physical and chemical adhesion is also well studied and involves dispersive forces (e.g., London and Keaton forces), acid base interactions (sometimes also referred to as polar forces), hydrogen bonds, and covalent bonds.

All, but macroscopic interlocking, of the above adhesion mechanisms are temperature dependent and may be locally promoted, e.g., by controlling the local temperature of the interface at the point where anchoring is desired. In case of preform assemblies, an adhesive may be applied at the desired anchoring point prior to fitting the inner preform into the outer one. The adhesive must resist the blow-moulding temperature and be compliant enough to stretch with the preform upon blowing.

Figure 3A:
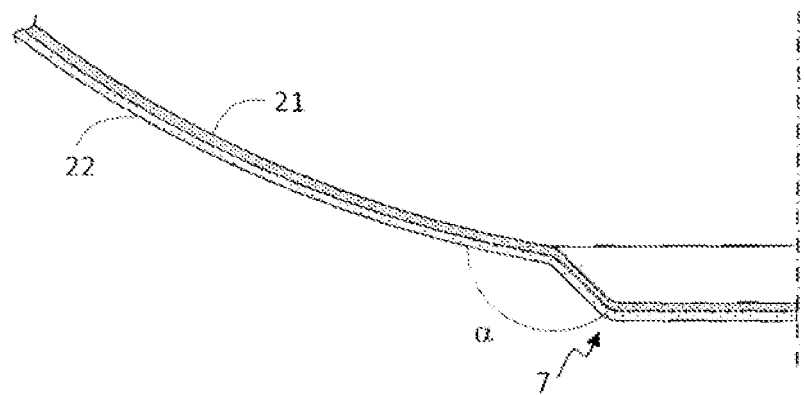
FIG. 3a illustrates an embodiment of ancharing in which the angle between the sump wall and the surrounding container's body wall is greater than or equal to 90 degrees, in which case an anchoring point is formed by enhanced friction between the inner and outer layer at the level of the protrusion.
Figure 3B:
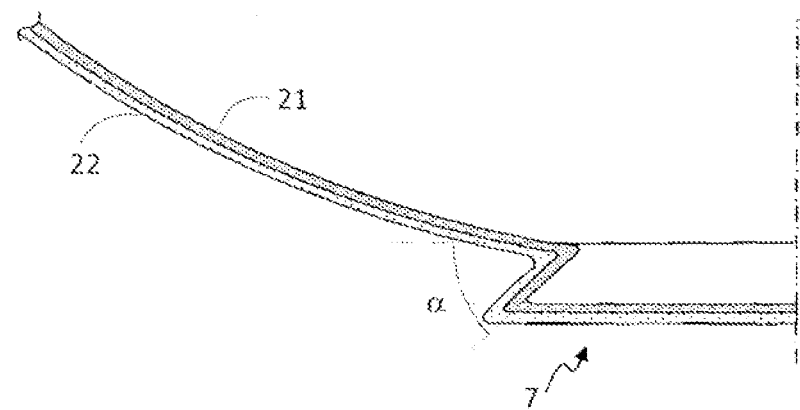
FIG. 3b illustrates an embodiment of anchoring in which the angle between the sump wall and the surrounding container's body wall is less than 90 degrees, in which case a mechanical interlocking of the two lavers is formed like a rivet.

As illustrated in FIGS. 3A and 3B, macroscopic interlocking may be achieved by using a blow-moulding tool comprising a sump or depression at the desired anchoring point, preferably at the bottom of the container as illustrated in FIG. 1. Upon blow-moulding the heated preform expands and the inner and outer layers engage into the sump. The angle, $\alpha$, formed by the sump wall with the surroundingcontainer's body wall maybe greater to or equal to 90 degrees, in which case an anchoring point is formed by enhanced friction between the inner and outer layer at the level of the thus produced protrusion (cf. FIG. 3A) or, alternatively, the angle can be smaller than 90 degrees, in which case a mechanical interlocking of the two layers is formed like a rivet (cf. FIG. 3B).

Preferably a stretching rod drives the preform downwards during the blow-moulding process to promote longitudinal stretching and to ensure that good contact of the preform with the tool's wall is effected at the desired point of anchoring.

In the case the angle, α, formed by the sump wall with the surrounding container's body wall is smaller than 90 degrees and the mechanical interlocking of the two layers is formed like a rivet, the anchoring point comprises an undercut. The creation of this undercut can be achieved in several methods, some of which are described below.

According to a first method, the undercut is created by using a blow-moulding tool comprising two half-moulds that are only partially closed at the location of the sump, the side walls of the half-moulds at the sump location defining a negative of the anchoring point to be created. The preform is driven down in the sump by means of a stretching rod, whereafter both half-moulds are moved towards each other to entirely close the mould, creating the undercut.

According to another method, a blow-moulding tool is used comprising axially moving pins that can be introduced in the mould cavity during blow-moulding, allowing creation of the undercut.

According to yet another method, the blow-moulding tool with half-moulds defining a sump negative to the anchoring point to be created. The preform being driven into the sump by means of the fluid pressure applied during blow-moulding thereof. In this method, a stretching rod may be used that either stops at a position distant from the sump or that extends into the sump. In the last case, it is preferred to use a stretching rod provided with a central fluid channel and lateral openings at its distal end (the end extending in the blow-moulding tool) that extends into the sump during stretching, such that part of the fluid used to stretch the preform is guided through the fluid channel and the lateral openings to facilitate stretching of the preform into the sump and against the inner wall the mould cavity defining the sump.

FIG. 2 schematically represents a blow-moulding tool with provided therein a chime comprising said sump or depression at the desired anchoring point. This chime is inserted in the blow-moulding tool prior to blow-moulding the preform, such that upon blow moulding the heated preform expands and the inner and outer layers engage into the sump. In this manner, the desired macroscopic interlocking is achieved and additionally a chime is provided on the container. In the case the sump defined by the chime is designed for the creation of an anchoring point in the form of a rivet, the anchoring point can successfully be created by means of fluid pressure forcing the material of the preform into the sump. Both methods applying a stretching rod and not applying a stretching rod can be used.

A release agent may be applied at the interface on either or both surfaces of the inner and outer layer, which are to form the interface of the bag-in-container. In the case the outer layer is injection moulded onto the inner layer, the release agent can be applied at the outer surface of the inner layer prior to moulding the outer layer. Any release agents available on the market and best adapted to the material used for the preform and resisting the blowing temperatures, like silicon- or PTFE-based release agents (e.g., Freekote) may be used. The release agent may be applied just prior to loading the preforms into the blowmoulding unit, or the preforms may be supplied pretreated.

The application of a release agent is particularly beneficial with respect to the design of the inner layer. Indeed, lowering the interferential adhesive strength facilitates delamination of the inner layer from the outer layer and hence reduces stress exerted on the inner layer upon delamination, as such the inner layer can be designed very thin and flexible without risking that the inner layer is damaged upon delamination. Clearly, the flexibility of the inner bag is a key parameter for the liquid dispensing and moreover costs savings can be achieved in terms on material savings when the inner layer can be designed very thin.

We claim:

1. An integrally blow-moulded bag-in-container obtainable by blow-moulding an injection moulded multi-layer preform, said bag-in-container comprising:
    an inner layer forming the bag and an outer layer forming the container;
    a single opening, the mouth, surrounded by a lip and fluidly connecting the volume defined by the bag to the atmosphere; and
    at least one interface vent fluidly connecting the interface between inner and outer layers to the atmosphere, wherein said bag-in-container allows controlled delamination of the inner bag from the outer container upon injection through said at least one interface vent of a pressurized gas at the interface between inner and outer layers, and wherein the bag is mechanically anchored to the outer layer at at least one point remote from said single opening and interface vent, wherein anchoring between the inner bag and the outer layer is formed during blow-moulding only.

2. The bag-in-container according to claim 1, wherein the anchoring point is obtained by locally enhanced chemical or physical adhesion between the inner and outer layers.

3. The bag-in-container according to claim 1, wherein the anchoring point is obtained by locally enhanced mechanical adhesion between the inner and outer layers.

4. The bag-in-container according to claim 3, wherein mechanical adhesion is locally enhanced by a protrusion formed by both inner and outer layers.

5. The bag-in-container according to claim 1, wherein the inner and outer layers are different materials.

6. The bag-in-container according to claim 1, wherein the inner and outer layers are the same material.

7. The bag-in-container according to claim 1, wherein the inner and outer layer are a material selected from PET, PEN, PTT, PA, PP, PE, HDPE, EVOH, PGAc, PLA, and copolymers or blends thereof.

8. The bag-in-container according to claim 1, wherein the at least one vent is in the shape of a wedge with the broad side at the level of the opening thereof and getting thinner as it penetrates deeper into the bag-in-container, until the inner and outer layers meet to form an interface.

9. The bag-in-container according to claim 1, wherein more than one vent is distributed around the lip of the bag-in-container's mouth.

* * * * *